7685X
S. Turner.
Machine for Glazing Wadding.
Patented Jul. 25, 1833.
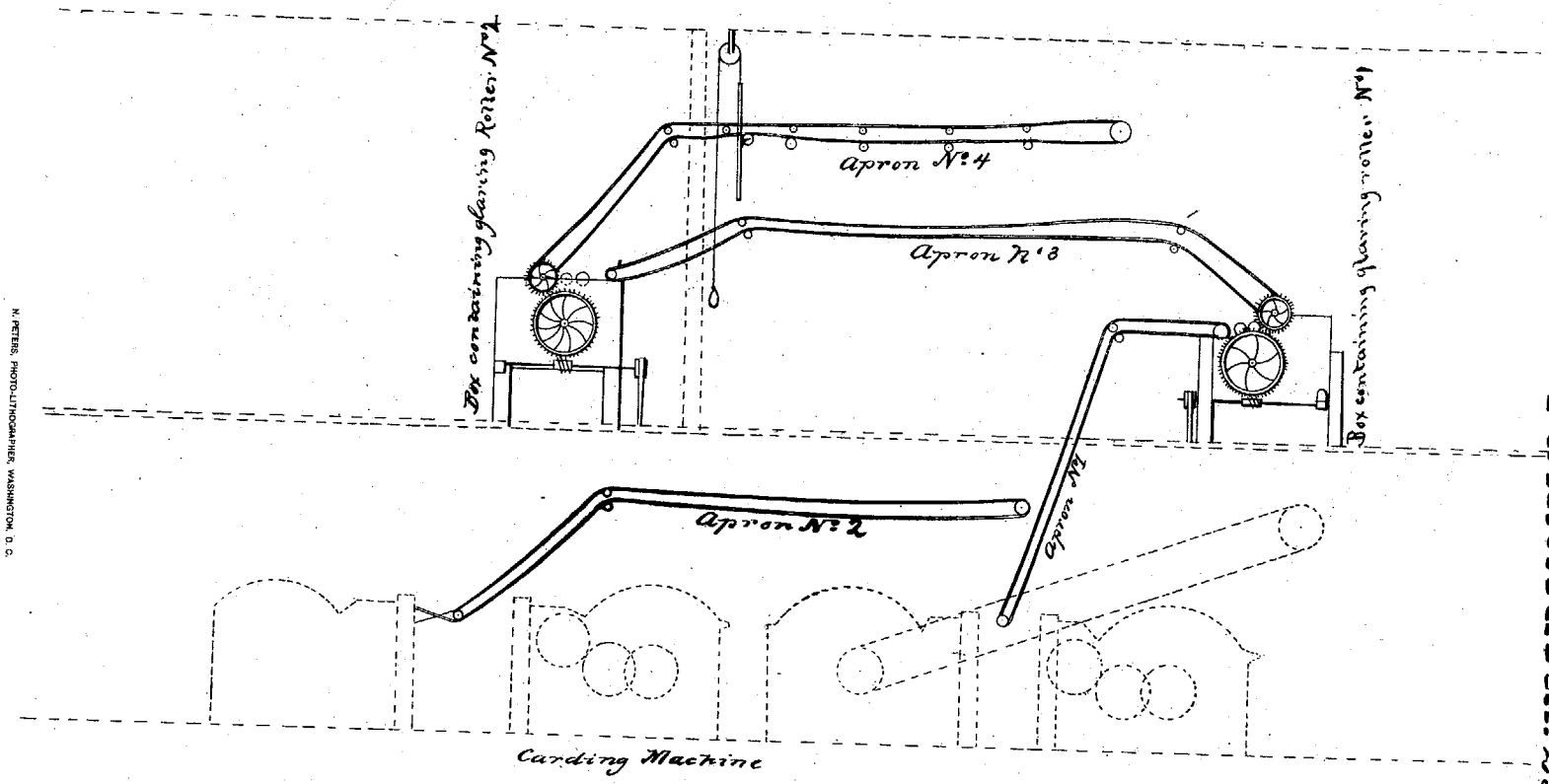
N. PETERS, PHOTO-LITHOGRAPHER, WASHINGTON, D. C.

7685x

Stukley Turner — Cranston, Rhode Island.
Letters Patent,

Dated July 25th 1833. Reissued October 6 1835.

The Schedule referred to in these Letters Patent and making part of the same containing a description in the words of the said Stukley Turner himself of his improvement in the mode of Glazing or preparing pelisse wadding or other cottons on both sides by a Machine called a glazing Machine, for which Letters Patent were granted dated the twenty fifth day of July 1833, which Letters Patent being hereby cancelled on account of a defective Specification. ——————

—— To all people to whom these presents shall come. Stukley Turner of Cranston in the County of Providence & State of Rhode Island Manufacturer sends Greeting ——

———— Be it known that I the said Stukley Turner have invented constructed made and applied to use a new and useful improvement referred to in the preceding petition, being an improvement in the mode of glazing or preparing pelisse wadding or other cottons (which require similar preparation) on both sides by a machine called a glazing machine specified in the words following viz An apron marked in the drawing No 1, passing over four rollers and of a sufficient length and width, receives the cotton as it comes from the carding machines in one continued sheet, and carries forward the cotton until it is brought into contact with the glazing roller, so called, which is at the end of this apron. One or two carding machines may be used to supply the apron with cotton and two or more aprons may be used but the cotton must all be received on one apron before it reaches the glazing roller and not more than two carding machines can be used for each apron; In the drawing hereunto annexed there are four carding machines and two aprons to receive the cotton from the carding machines the aprons being numbered 1 and 2. The glazing roller revolves in a box or case which is open at the top and which is partly filled with the gum matter or glazing liquor; so that the surface of the glazing roller is sufficiently supplied by its greater part being always in contact with the liquor. The cotton having reached the glazing roller as aforesaid passes on to it and between that and two smaller rollers which are placed over it for the purpose of pressing the cotton to the glazing roller so that it may receive from the surface of the glazing roller a sufficient quantity of the glazing matter. The cotton having thus passed through the rollers by which one side is glazed is received by and on to a third apron marked on the drawing No 3 which passes over rollers like the first. This apron is brought close to the glazing roller on the side nearly opposite to that at which the cotton enters on to said glazing roller and being raised by friction rollers so as to run clear of the glazing apparatus it passes off in a horizontal direction carrying the cotton in an inverted position (the glazing side being now uppermost) directly back above the glazing apparatus and above the apron, on to which it was first received. This third apron being several yards in length carries the cotton towards the opposite side of the room from which the said glazing roller is placed, and the cotton being partly dried in its progress by the application of heat and air and the unglazed side being now the lower side, is in a proper condition and position to pass on to the second glazing roller which is placed at the other end of the room (constructed and prepared in the same manner as the first) for the purpose of glazing the unglazed side. Having passed through the second glazing roller, the sheet of cotton is now received on to a fourth apron, marked in the drawing No. 4 (constructed like that which takes the cotton from the first glazing roller) and is carried again on this fourth apron (the newly glazed side being now uppermost) above said second glazing roller and above said third apron back to the opposite end of the machine above it turns with the apron over a roller and under the same and directly under the upper part of the same apron the newly glazed side now being downwards and the other side adhering to the underside of the apron it passes back again in an opposite direction horizontally until being perfectly dry on both sides it leaves from the apron and is received on to a beam on which it is rolled up the beam being turned by the apron. The sheet of cotton when it has been received on to the fourth apron after having passed the second glazing roller may be rolled off on to the beam from said apron at the point where said apron turns to come back towards the second glazing roller, provided the apron be of sufficient length to dry the cotton instead of being brought back under the apron towards the second glazing roller as above described. The carding machines from which the sheets of cotton proceed are placed most conveniently in a lower story and directly under the machine, and the sheet of cotton consisting of several layers proceeds on the first and second aprons towards the machine in the next story. The glazing rollers may be covered with lead or other metal and may be about fifteen inches diameter. The pressing rollers may be about three and a half inches diameter.

7685x July 25, 1833

[illegible]

The l[illegible] of the machine should be such that aprons may be of sufficient length for drying the sheet of cotton in its progress. The machine should be geared in such a way so that the velocity of all the glazing rollers may be equal and the progress of the cotton on the aprons may be equal and uniform. If the sheet of cotton is brought back under the fourth apron toward the second glazing roller as before mentioned the length of the aprons which take the cotton from the first to the second glazing roller, and from the second roller may be about twenty five feet; if the sheet of cotton is turned off on to the beam without being brought back under the apron, the apron should be proportionably longer.

Of the above described machine I claim as my invention the improvement of taking the cotton from the carding machines and carrying it on an apron or aprons to the first glazing roller.

I also claim as my invention the improvement of placing at the other end of the machine a second glazing roller with two upper rollers all constructed like the first, to glaze the other side of the sheet of cotton.

I also claim as my invention the improvement of placing two pressing rollers instead of one over each glazing roller.

I also claim as my invention the improvement of carrying the cotton to the second glazing roller by an apron after it has passed over the first glazing roller and of carrying the cotton after it has passed over both glazing rollers and been glazed on both sides on an apron until it is sufficiently dried and then of rolling it on a beam, which is revolved by the friction of the last mentioned apron; In testimony that the above is a true specification of my improvements aforesaid as above described I have hereunto set my hand this ninth day of September A.D. Eighteen hundred and thirty five Witnesses
Ru Greene
John P. Snow Stukley Turner Exd. W.G.E. (1392 vols)

[illegible]